United States Patent [19]
Harriman et al.

[11] Patent Number: 6,112,265
[45] Date of Patent: *Aug. 29, 2000

[54] SYSTEM FOR ISSUING A COMMAND TO A MEMORY HAVING A REORDER MODULE FOR PRIORITY COMMANDS AND AN ARBITER TRACKING ADDRESS OF RECENTLY ISSUED COMMAND

[75] Inventors: David J. Harriman, Sacramento; Brain K. Langendorf, El Dorado Hills; Robert J. Riesenman, Cordova, all of Calif.

[73] Assignee: Intel Corportion, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/835,388

[22] Filed: Apr. 7, 1997

[51] Int. Cl.$^7$ .................................................. G06F 13/18
[52] U.S. Cl. .............................. 710/40; 710/39; 710/41; 711/151; 711/158
[58] Field of Search ................... 395/672, 800.28, 395/292, 874; 711/169, 151, 158; 710/111, 6, 54, 244, 39, 40, 41; 709/3, 4, 102, 103

[56] References Cited

U.S. PATENT DOCUMENTS

| | | | |
|---|---|---|---|
| 3,350,694 | 10/1967 | Kusnick et al. ...................... | 340/172.5 |
| 4,521,851 | 6/1985 | Trubisky et al. ...................... | 712/218 |
| 4,774,659 | 9/1988 | Smith et al. ............................. | 364/200 |
| 4,791,554 | 12/1988 | Hirota et al. ............................ | 364/200 |
| 4,809,217 | 2/1989 | Floro et al. .............................. | 364/900 |
| 5,008,808 | 4/1991 | Fries et al. ............................... | 364/200 |
| 5,140,683 | 8/1992 | Gallo et al. .............................. | 395/425 |
| 5,583,134 | 12/1996 | Oneto et al. ............................. | 395/485 |
| 5,603,063 | 2/1997 | Au .............................................. | 710/52 |
| 5,613,155 | 3/1997 | Baldiga et al. ......................... | 395/825 |
| 5,666,551 | 9/1997 | Fenwick et al. ........................ | 395/200 |
| 5,732,236 | 3/1998 | Nguyen et al. ......................... | 711/151 |
| 5,787,298 | 7/1998 | Broedner et al. .................. | 395/750.05 |
| 5,796,413 | 8/1998 | Shipp et al. ............................. | 345/522 |
| 5,809,278 | 9/1998 | Watanabe et al. ...................... | 711/150 |
| 5,812,799 | 9/1998 | Zuravleff et al. ....................... | 710/128 |
| 5,822,772 | 10/1998 | Chan et al. ............................. | 711/158 |

FOREIGN PATENT DOCUMENTS

0843262A2  5/1998  European Pat. Off. .

*Primary Examiner*—Thomas C. Lee
*Assistant Examiner*—Ilwoo Park
*Attorney, Agent, or Firm*—Leo V. Novakoski

[57] ABSTRACT

A system and method is provided for enhancing the efficiency with which commands from and initiating device to a resource are processed by the resource. The system includes a command queue, a plurality of command reorder slots coupled to the command queue, and command selection logic coupled to the resource and the command reorder slots. Commands ready for processing are loaded into the command reorder slots, and the command selection logic applies an efficiency criterion to the loaded commands. A command meeting the efficiency criterion is transferred to the resource for processing. The system may also include response reordering logic, which is coupled to the command reorder logic. The response reorder logic returns to original command order data provided in response to reorder read commands.

19 Claims, 9 Drawing Sheets

SYSTEM FOR ISSUING A COMMAND TO A MEMORY HAVING A REORDER MODULE FOR PRIORITY COMMANDS AND AN ARBITER TRACKING ADDRESS OF RECENTLY ISSUED COMMAND

BACKGROUND OF THE INVENTION

1. Technical Field

This invention relates to the field of processing commands to a resource, and in particular to systems and methods for rearranging the order in which commands to a resource are processed.

2. Related Art

Modem computer systems include a variety of devices that are coupled through one or more buses to access different resources in the computer system. For example, a computer system may include a central processing unit (CPU), a graphics system, and peripheral devices, each of which may access a resource such as main memory. In order to minimize latencies, commands from a device initiating an access to the resource must be transferred and implemented as efficiently as possible. The speed with which commands are transferred between a resource and initiating device is governed largely by the intervening buses and the arbitration scheme employed in the computer system. The speed with which commands are implemented at the resource is determined by the nature of the resource and, in many cases, by the order in which the resource processes commands from the initiating device. The faster the resource implements commands, the sooner the device can continue its operations and the sooner the resource can be made available to other devices.

The dependence of resource efficiency on command order may be understood with reference to storage resources such as random access memories ("RAMs"), hard and floppy discs, compact discs (CD) ROMs, digitial video discs (DVDs) and the like. Each of these storage resources is a two dimensional array of addressable data storage locations, with each location specified by two parameters, e.g. row/column, track/sector, page/column, etc. Communicating each parameter to the storage device and activating the associated row, column, track, sector, page, etc., contributes a time delay or overhead to the access. To the extent that storage locations can be accessed without updating both parameters, access times for the resource can be reduced and the resource made to operate more efficiently. Paged memories and other memory architectures are designed to do just this. For example, a memory operating in page mode can access a range of addresses (columns) on the same (open) page without incurring the delay associated with updating the page parameter.

Certain storage resources, e.g. DRAMs, are also characterized by a cycle time, which represents the time necessary to precharge the resource between accesses. The cycle time limits the speed with which consecutive accesses can be made to a DRAM. Interleaved memories are organized into groups of DRAMs or memory banks to minimize overhead due to cycle times. Blocks of contiguous data are mapped to different memory banks (interleaving), and data blocks are retrieved by overlapping accesses to different memory banks. This reduces the impact of each DRAM's cycle time on the data access time and allows the resource to operate more efficiently.

By storing a data block with the appropriate addressing scheme, paging, interleaving, and other strategies allow a command targeting the data block to be implemented with reduced latency. However, these benefits extend across command boundaries only when contiguous commands to the resource happen to access data that falls in the sequence prescribed by the memory organization. In effect, paging, interleaving, and like strategies enhance efficient resource operation with respect to the data targeted by a given command, but do not provide any mechanism to extend these efficiencies across multiple commands. Such a mechanism requires reordering commands sent to the resource according to the state of the resource.

Command reordering has been implemented in a few specific cases. For example, some processors can reorder instructions to eliminate data dependencies and avoid pipeline stalls attributable to unavailable resources. However, this reordering occurs within the processor and does not implicate the efficiency with which resources outside the processor are used. Some chipsets implement "lazy writes", which wait for a read hit to an address before implementing a pending write to the same address. However, this is a passive technique which does not actively reorder commands within a command stream.

There is thus a need for a system that reorders commands to a resource in a manner that allows the resource to operate more efficiently and reduce the latency with which commands to the resource are implemented.

SUMMARY OF THE INVENTION

The present invention is a system and method for reordering commands to a resource to increase the efficiency with which the resource is utilized. The invention is applicable to resources having latencies determined in part by the order in which resource operations are implemented.

In accordance with the present invention, an initiating device sends commands to a resource characterized by an efficiency criterion. The efficiency criterion is applied to the commands, and a command satisfying the criterion is transferred to the resource for processing.

In one embodiment of the invention, commands are coupled from an initiating device to a resource through reorder logic. The reorder logic includes two or more reorder slots that are coupled to the resource through command selection logic. Commands sent by the initiating device are loaded into the reorder slots. The command select logic monitors a parameter that reflects efficient operation of the resource and selects a command for issue to the resource according to the monitored parameter. For example, where the resource is a paged memory, the parameter may be the current open page and the criterion may be that the selected command targets a resource address on the open page.

BRIEF DESCRIPTION OF THE DRAWINGS

The present invention may be understood with reference to the following detailed description and the drawings indicated therein.

DETAILED DESCRIPTION OF THE INVENTION

The present invention is a system and method for reordering commands sent by an initiating device to a resource. The commands are reordered in a manner that maximizes the efficiency with which the resource is utilized. The invention may be implemented using reorder logic to couple data between the initiating device and the resource, and is applicable to resources and initiating devices that meet certain criteria. In particular, suitable initiating devices are those that can pipeline commands to a resource and have at least one class of commands that can be reordered prior to transfer to the resource.

Suitable resources are those that may be made to operate more efficiently through command reordering. For example, DRAMs, flash memories, CD ROMs, DVDs, hard discs and floppy discs are resources that may operate more efficiently by reordering commands to reduce memory access times or eliminate memory cycle time delays between successive commands. Suitable efficiency criteria may include spatial locality of targeted addresses, temporal locality of commands, or alternating locality of targeted addresses.

One embodiment of the spatial locality criterion reduces memory access overhead by selecting commands that target locations on the current open page (row) of a paged memory, e.g. an address in the current open address range of the resource. An embodiment of the temporal locality criterion reduces memory access overhead by issuing commands targeted to a localized area of memory, e.g. a page, row, or track, in clusters. This allows clusters of commands to be processed to the same page, row, track, etc. before the page, row, track buffer is flushed. An embodiment of alternating locality criterion selects commands in anticipation of the memory bank alteration that occurs in interleaved memories. This reduces the overhead attributable to the cycle time of any one memory bank.

These efficiency criteria are intended to be illustrative and not exhaustive. Essentially, any criterion that selects commands for processing in a manner that reduces access or operational overhead of a resource is suitable for use in the present invention.

In the disclosed embodiment, the initiating device is a graphics system and the resource is a memory device having a paged memory structure. In this discussion, "paged memory structure" means a memory that is designed so that at a given time, some subset of available memory may be accessed with lower latency than the remaining portions of the memory. Typically, the memory is divided into equal sized pages, of which one (or occasionally more) may be "open" at any given time. The remaining pages are "closed", and accessing addresses on these pages consumes additional overhead. For convenience, the following discussion refers to an open page with the understanding that the invention also encompasses those resources for which more than one page may be open at a time. In addition, resource addresses within, for example, a currently open page of a paged memory, the next memory bank accessed in an interleaved memory, or similar resource feature that can be accessed with reduced overhead, are referred to as open addresses.

It is noted that the disclosed paged memory resource is provided for illustration. The resource may be, for example, any storage device for which data access times can be reduced by command reordering or any other resources having command order dependent latencies.

The graphics system is capable of pipelining read and write requests to the memory device, either of which command types may be reordered under specified conditions. In one embodiment of the invention, read commands are considered for reordering, and the reorder test is provided by the paged structure of the memory device. As noted above, paged memories have a lower latency when successive read commands target addresses on the same page. Commands may thus be reordered according to the addresses they target and the currently open page(s) in memory.

Figure 1:
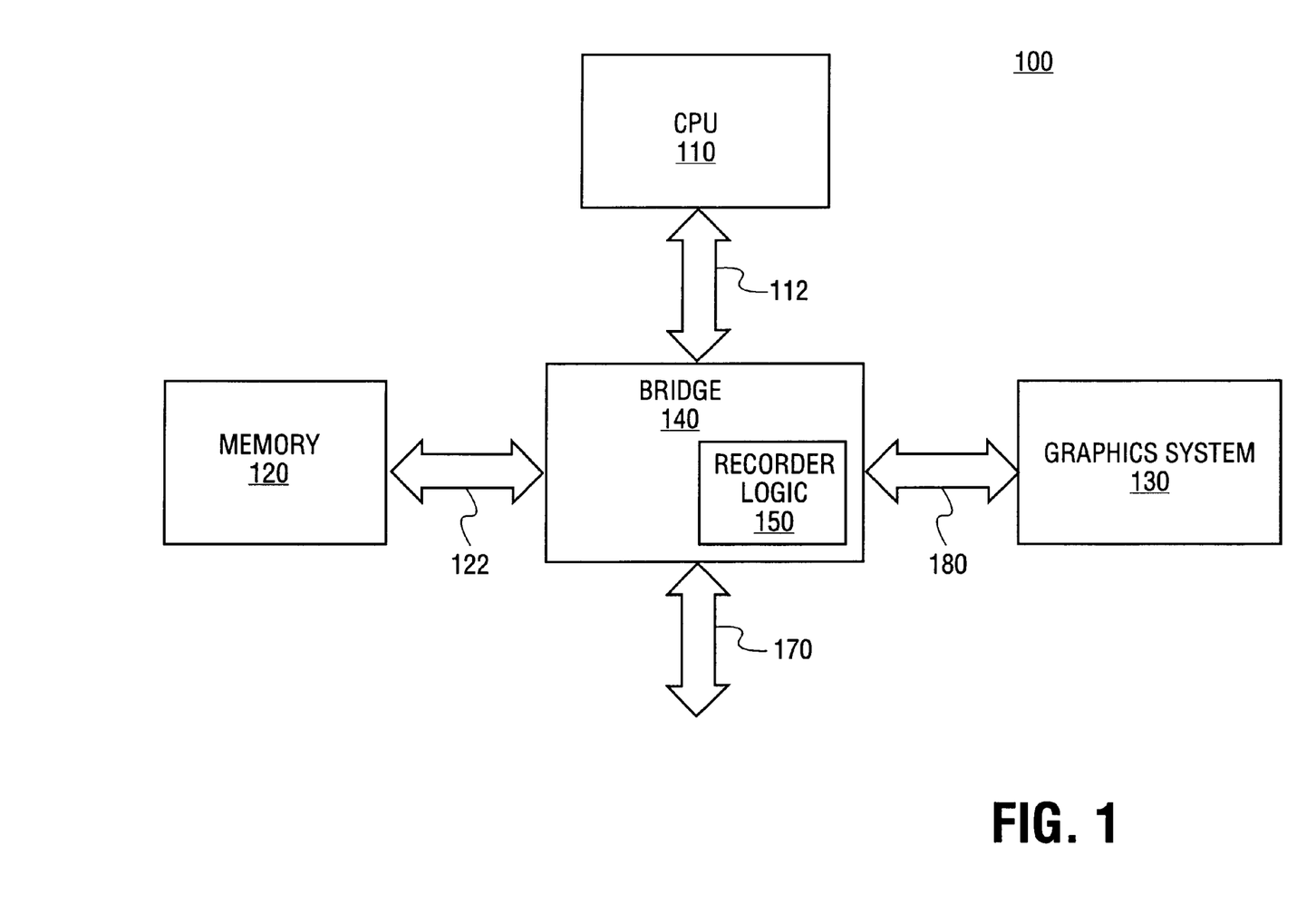
FIG. 1 is a block diagram of a computer system including command reorder logic in accordance with the present invention.

Referring first to FIG. 1, there is shown a block level diagram of one embodiment of a computer system 100 incorporating the reorder logic of the present invention. Computer system 100 comprises a processor 110, a memory device 120, a graphics system 130, and a bridge 140 that includes reorder logic 150. Processor 110, graphics system 130, and memory device 120 are coupled to bridge 140 through a processor bus 112, an interconnect 180, and a memory bus 122, respectively. Also shown in FIG. 1 is a bus 170 (optional) for coupling peripheral devices (not shown) to computer system 100. The configuration of computer system 100 is provided for illustration only and is not required to implement the present invention.

In one embodiment of the invention, interconnect 180 is an Accelerated Graphics Port ("A.G.P.") and I/O bus 170 is a Peripheral Component Interconnect ("PCI") bus. A.G.P. is described, for example, in *Accelerated Graphics Port Interface Specification,* Revision 1.0, published by Intel Corporation on Jul. 31, 1996. PCI is described, for example, in Shanley & Anderson, *PCI System Architecture,* Addison Wesley, Reading, Mass. (1995).

Bridge 140 routes data and commands among processor 110, memory device 120, graphics system 130, and any peripheral devices on bus 170. Reorder logic 150 in bridge 140 receives commands sent from graphics system 130 to memory device 120 and reorders these commands to increase the efficiency with which they are processed by memory device 120. For read commands, reorder logic 150 also receives data provided by memory device 120 in response to the reordered read commands and routes the received data to graphics system 130. In one embodiment of the invention, reorder logic 150 returns response data to graphics system 130 in the order in which the corresponding commands were originally sent by graphics system 130 (original command order or OCO).

Figure 2A:
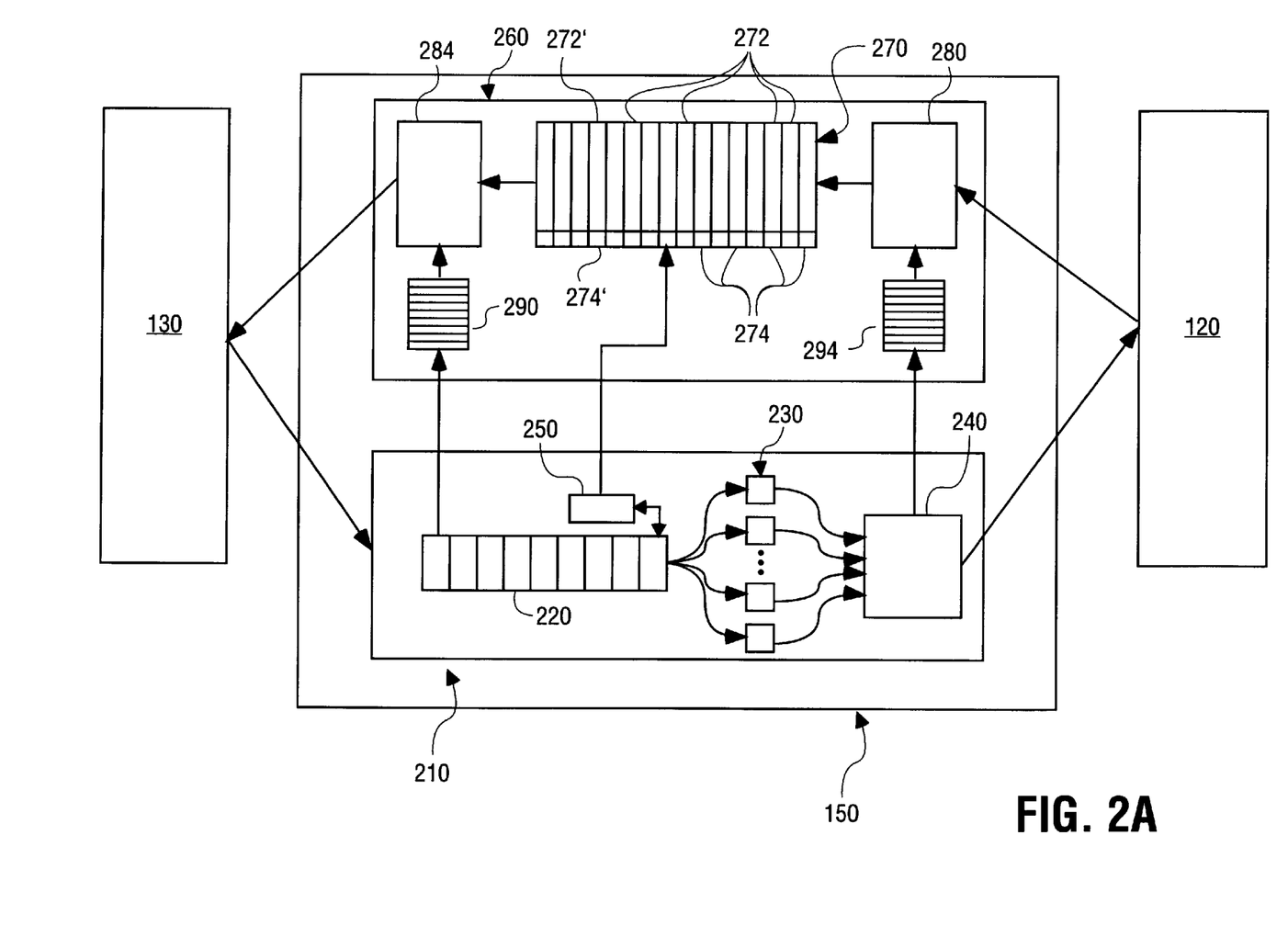
FIG. 2A is a block diagram of one embodiment of the command reorder logic of FIG. 1.

Referring now to FIG. 2A, there is shown a block diagram of reorder logic 150 suitable for reordering read commands and, where necessary, restoring to OCO data provided in response to reordered commands. Reorder logic 150 comprises command reorder logic 210 and response reorder logic 260. Command reorder logic 210 reorders commands sent by graphics system 130 to memory 120 according to an efficiency criterion. In one embodiment of the invention, the criterion is based on the memory address targeted by commands and the current open page of memory 120. In this embodiment, command reorder logic 210 picks out commands according to an indication of the last page accessed in memory 120 to reduce the number of page breaks generated by accesses to memory 120. For example, reorder logic 210 may select a command for issue that specifies a memory address matching an open page indication provided by memory 120, or it may select a command targeted to the same page as that of the last command issued to memory 120. In the latter case, command reorder logic 210 does not require input from memory 120. The order of commands generated by reorder logic 210 to increase the efficiency with which a resource operates is hereafter referred to as resource order (RO).

Response reorder logic 260 is included where an initiating device must receive read response data in the same order in which the initiating device issued the corresponding read commands. For example, where interconnect 180 is an A.G.P. intercolnect, responses are expected to be returned to the initiating device in the same order in which the commands were issued by the initiating device. Accordingly, response reorder logic 260 reorders data provided by memory 120 in response to reordered read commands from RO to OCO.

Referring still to FIG. 2A, command reorder logic 210 comprises a command queue 220 which is coupled to memory 120 through reorder slots 230 and command select logic 240. Gating logic 250 is coupled to command queue 220 and to a read data return buffer ("RDRB") 270. Commands received from graphics system 130 are entered in command queue 220 and forwarded to reorder slots 230 according to a determination made by gating logic 250. In one embodiment, commands are moved through command queue to reorder slots 230 in first-in first-out (FIFO) order. When a command reaches the head of command queue 220, gating logic 250 determines whether conditions permit forward progress of the command to continue, and forwards the command to reorder slots 230 when conditions are suitable. For example, gating logic 250 may stall a read command until space is available in RDRB 270 to accommodate response data. For write command reordering, gating logic 250 may stall a write command until the data to be written is received in a separate write data buffer (not shown).

To avoid deadlock, gating logic 250 checks the availability of buckets 272 in RDRB 270 to accommodate data provided in response to a read command. Here, "buckets" refers to locations for storing data, while "slots" refers to locations that store commands. Gating logic 250 determines the size of data being requested by a read command and compares the requested data size with available buckets 272 in RDRB 270. The read command is forwarded to reorder slots 230 when sufficient buckets 272 are available in RDRB 270 to accommodate the data size requested in the read command.

Many initiating devices expect read response data to be returned in the same order in which the device issued the corresponding read commands, i.e. OCO. For these devices, space is reserved for read response data in RDRB 270 in OCO, with the reserved locations wrapping around RDRB 270 in circular fashion. Read response data occupies one or more buckets 272 of RDRB 270, depending on the size of the data block requested by the read command. Availability of each bucket 272 is tracked through an associated valid data bit 274. For example, valid data bit 274' is set when data is loaded into associated slot 272' and reset when the data is unloaded from associated slot 272'. Gating logic 250 must allocate buckets 272 in a manner that allows command reordering to proceed without deadlock.

In one embodiment, gating logic 250 uses valid bits 274 to determine whether enough contiguous buckets 272 are available to accommodate the data size requested by the read command. In this embodiment, gating logic 250 maintains a pointer to a first available bucket 272', determines a number N of buckets 272 necessary to accommodate the requested data size, and determines whether N-1 buckets 272 following first bucket 272' are available, i.e. have associated valid bits 274 reset. If so, the command is forwarded to reorder slots 230 along with an indication of which bucket(s) 272 has been reserved for the read response. If not, the command is retained in command queue 220 until sufficient buckets 272 are available for the response data.

An alternative embodiment of gating logic 250 uses a counter circuit to track the amount of data currently outstanding in the system and, consequently, the number of buckets 272 available in RDRB 270. A pointer tracks the first available bucket 272. The data size requested by a read command is compared with the number of available buckets 272, and the read command is forwarded to reorder slots 230 or stalled, depending on whether or not sufficient space is available for the response in RDRB 270.

Once gating logic 250 determines that forward progress of a command may continue, e.g. when space is available in RDRB 270 for data requested by a read command, the command is forwarded to one of reorder slots 230. Reorder slots 230 are coupled to memory 120 through command select logic 240. Command select logic 240 monitors an indication of the area of memory 120 that was last accessed. Command select logic 240 also monitors reorder slots 230 to determine which memory addresses are targeted by the read commands in these slots. According to one efficiency criterion, command select logic 240 selects a command from reorder slots 230 targeted to an address in memory 120 having a reduced access latency, e.g. a command targeting the open page(s) in a paged memory.

As noted above, paged memory 120 can access a targeted memory address more quickly when the targeted address is on the page currently open in memory 120. Accesses to different pages generate page breaks, which take longer to service. One embodiment of command select logic 240 checks an indication of the current open page in memory 120 and determines if any command in reorder slots 230 is targeted to this page. This indication may be provided in a variety of ways. For example, command reorder logic 210 may receive a hint from memory 120 as to its current open page. This approach has the advantage of tracking page changes due to commands from other devices. Alternatively, command select logic 240 may track the memory location specified in the last command it issued. While this approach does not account for page changes induced by accesses from other devices, it is relatively simple to implement. Another alternative is to invalidate an indication derived from the last command selected by command select logic 240 when a page break is detected in memory 120.

When a command targeted to the current page is present in reorder slots 230, command select logic 240 selects this command for issue to memory 120. If more than one command is targeted to the current page, command selection logic 240 may apply an additional or secondary criterion to distinguish between the commands. In one embodiment of the invention, command select logic 240 selects the command that has been in reorder slots 230 the longest and issues it to memory 120. Other possible criteria for selecting among commands to the open page include selecting the command associated with the largest or smallest data block or selecting a command randomly.

If none of the commands in reorder slots 230 is targeted to the current open page in memory 120, command select logic 240 may select a command according to the secondary criterion or still another criterion.

A secondary criterion that selects the oldest command in reorder slots 230 may be implemented in a number of different ways. In one embodiment, the locations of slots 230 may be used to indicate the relative age of commands contained in slots 230. For example, reorder slots 230 may be ordered from top to bottom, and the longer a command has been in reorder slots 230, the higher the position it occupies in reorder slots 230. With this configuration, if none of the commands in reorder slots are targeted to the current page of memory 120, command select logic 240 issues the command in the top most one of slots 230 to memory 120. The remaining commands are shifted upward in slots 230 and a new command is transferred from command queue 220.

Alternatively, each command may be time-stamped when it is loaded into reorder slots 230. When none of the commands in reorder slots 230 are targeted to the current open page in memory, command select logic 240 checks the time stamps of the commands and selects the command having the oldest time stamp. This approach requires additional logic to identify the oldest command, but it eliminates the need to shift commands in reorder slots 230 each time a command is issued to memory 120.

Figure 2B:
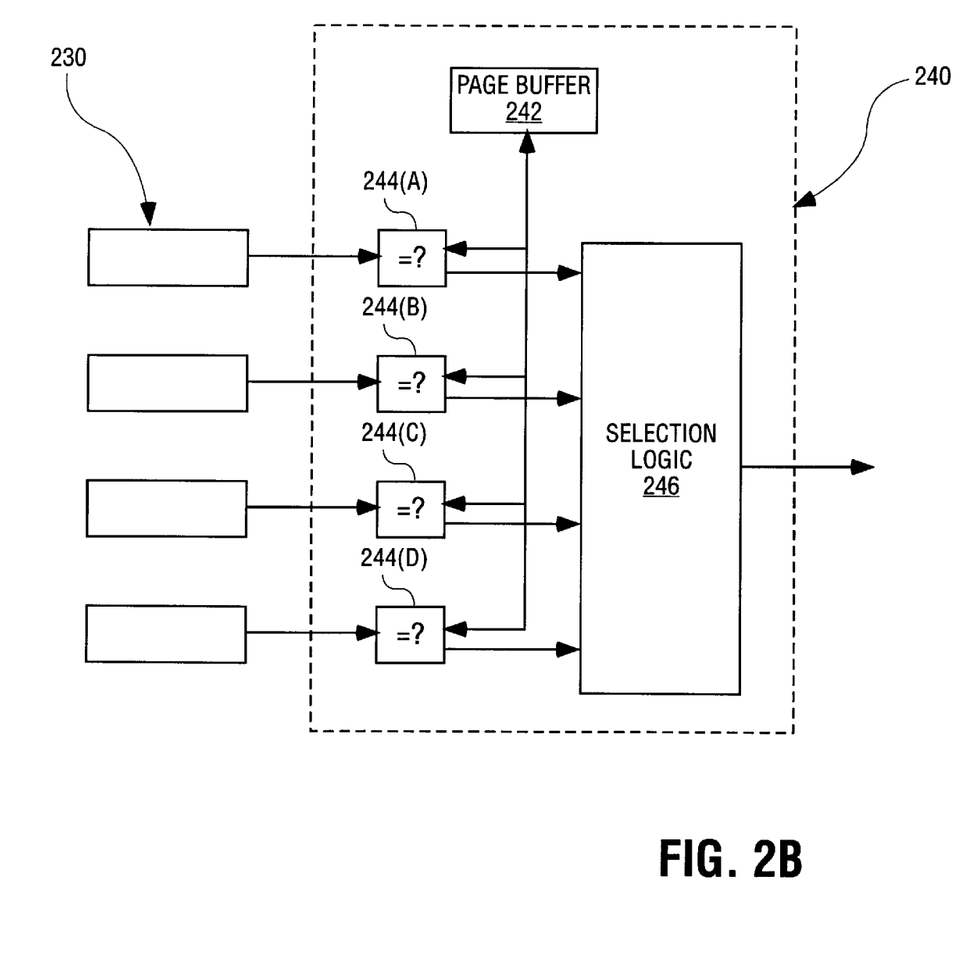
FIG. 2B is a block diagram of the command selection logic of FIG. 2A.

Referring now to FIG. 2B, there is shown an embodiment of command select logic 240 in accordance with the present invention. While the embodiment of FIG. 2B is shown with four reorder slots 230, the invention is not limited to this number. Command select logic 240 comprises a buffer 242, comparison modules 244(*a*)–244(*d*), and selection logic 246. Buffer 242 stores an stores an indication of the last page accessed in memory 120. As noted above, the indication may be obtained from memory 120 or from the last command selected for issue by command select logic 240.

Comparison modules 244(*a*)–244(*d*) are each coupled to one of reorder slots 230, as well as to buffer 242 and selection logic 246. Comparison modules 244(*a*)–244(*d*) compare the target address specified by the command stored in their associated reorder slots 230 with the current open page indicated in buffer 242. According to one set of criteria, selection logic 246 issues to memory 120 the command in the top most one of reorder slots 230 (secondary criterion) targeted to the same page (efficiency criterion) specified in buffer 242. If none of comparison modules 244(*a*)–244(*b*) indicates a positive comparison, selection logic 246 issues a command according to a default criterion. One such criterion issues the command in the top most one of reorder slots 230, i.e. the command in reorder slots 230 longest.

When the indication of the current open page in memory 120 is provided by the target address of the last command issued by reorder logic 210, this information is stored in buffer 242. When other devices access addresses on different pages of memory 120 between commands from graphics system 130, the page indication in buffer 242 will not be accurate. In an alternative embodiment of command select logic 240, buffer 242 may be coupled to memory 120 so that the contents of memory buffer 242 may be invalidated if such an intervening access occurs. In still another embodiment of command selection logic 240, buffer 242 may receive an indication of the target page in such an intervening access and update its contents accordingly. In general, the open page indication may be based on internally stored data or data received from an external source e.g. the resource controller, and in either case, an external agent may provide additional "hints" by, for example, invalidating the page indication in buffer 242.

Referring again to FIG. 2A, command select logic 240 is shown coupled to a resource order (RO) buffer 294. When command select logic 240 issues a command to memory 120, it also provides an indication of buckets 272 assigned to receive the corresponding read response data. This allows commands issued to memory 120 in RO to be loaded into RDRB 270 in OCO by load logic 280. This process is discussed below in greater detail.

As noted above, not all commands may be suitable for reordering. The verification logic necessary to support reordering of some commands may be too costly and complex to justify the efficiency gain. Alternatively, commands may be ordered by the initiating device according to a different criterion, and reordering these commands may interfere with the ordering scheme implemented by the initiating device.

Figure 2C:
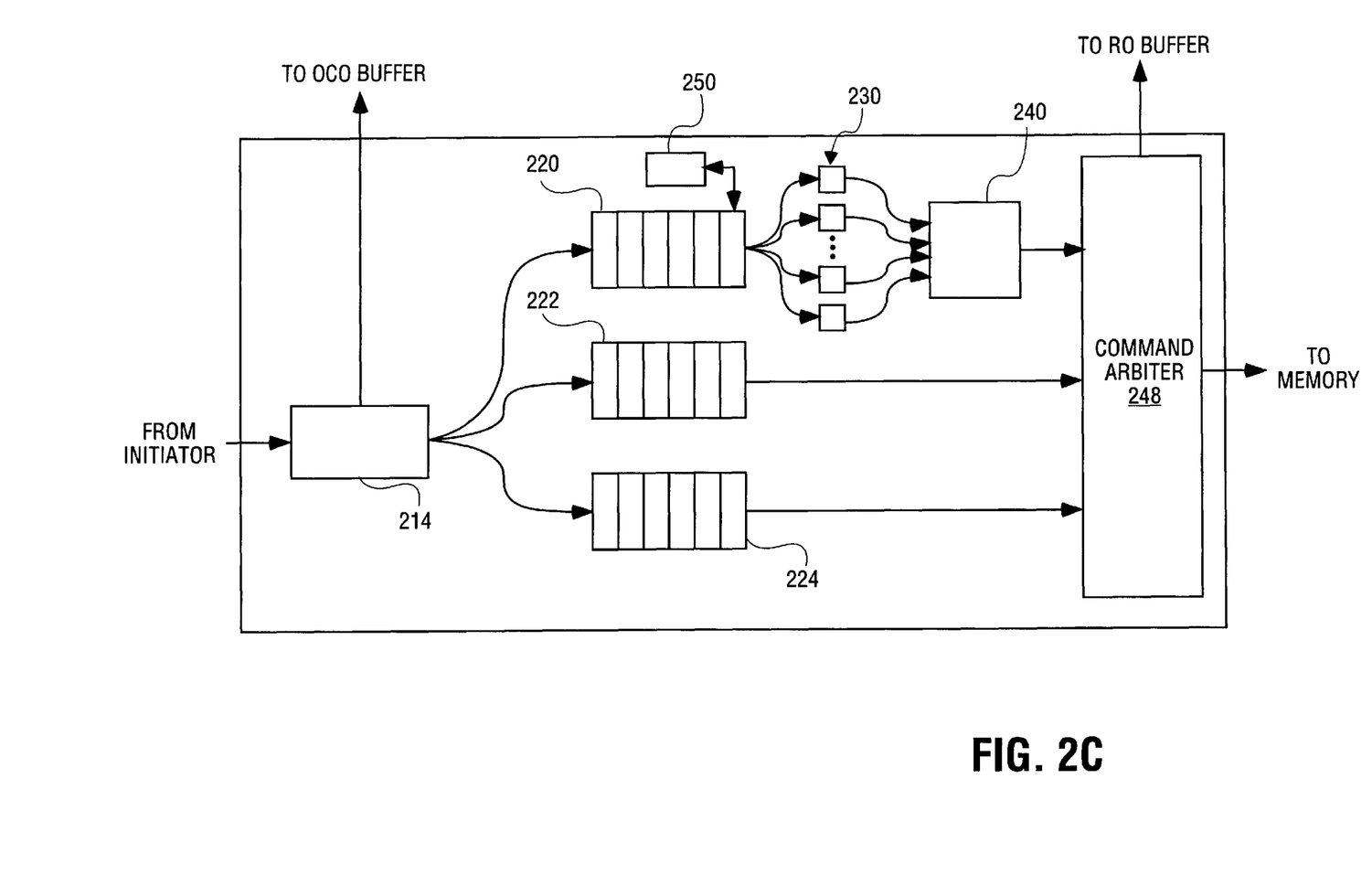
FIG. 2C is a block diagram of an embodiment of command reorder logic of FIG. 1 in which a subset of the commands are reordered.

Referring now to FIG. 2C, there is shown a block diagram of an embodiment of command reorder logic 210 (210') that accommodates different classes of commands. For example, the disclosed embodiment of command reorder logic 210' is suitable for initiating devices that generate high and low priority read and write commands. Commands that must be issued with low latency are issued as high priority commands, and are typically not suitable for reordering. In this case, command reorder logic 210' separates out low priority commands for reordering and sends high priority commands to high priority command queue.

Consider the case where command reorder logic 210' reorders low priority reads, while low priority writes and high priority reads and writes are processed to memory 120 in OCO. In this embodiment of command reorder logic 210', command queue 220 for low priority reads is substantially as indicated in FIG. 2A. However, a low priority write queue 222 and a high priority read/write queue 224 are also included in reorder logic 210'. In addition, a command decoder 214 is included between graphics system 130 and command queues 220, 222, and 224 to decode commands and route them to the appropriate queue.

Reorder logic 210' also includes a command arbiter 248 for receiving commands from queues 220, 222, 224 and selectively forwarding them to memory 120. In this embodiment of reorder logic 210', low priority read commands are reordered to minimize page faults, as described above. High priority reads and writes are issued to memory 120 by command arbiter 248 according to a different priority scheme. Typically, high priority reads and writes will be issued prior to low priority reads and writes. Since high priority reads must also return data, command queue 224 will have associated gating logic (not shown) for ensuring return buffer space is available for response data. The gating logic may be incorporated in command arbiter 248 to monitor slot availability in a dedicated high priority read data return buffer (not shown). Alternatively, the gating logic may share RDRB 270 with queue 220. In this case, high priority read commands must be tracked in OCO and RO buffers 290, 294, respectively, to ensure that read response data is properly correlated with slots 272.

In general, command arbiter 248 provides an additional level of command selection to ensure that high priority commands are not delayed by low priority reads or writes. In one embodiment of reorder logic 210', command arbiter 248 may be coupled to buffer 242 of command select logic 240 to reflect pages targeted by an intervening low priority write or high priority read/write.

Referring again to FIG. 2A, response reorder logic 260 restores to OCO data provided by memory 120 in response to reordered read commands. As discussed above, command reorder logic 210 (210') reorders commands from OCO to RO, and memory 120 processes these read commands to generate read response data in RO. Response reorder logic 260 is included, where necessary, to return the response data to OCO.

Response reorder logic 260 includes load logic 280, unload logic 284, RDRB 270, an original command order (OCO) buffer 290 and a resource order (RO) buffer 294. RDRB 270 is coupled to memory 120 through load logic 280 and to graphic system 130 through unload logic 284. OCO buffer 290 is coupled to monitor commands sent to reorder logic 150 by graphics system 130 and to provide information on these commands to unload logic 284 for use in retrieving data from RDRB 270. OCO buffer 290 monitors the size of data requests in OCO.

RO buffer 294 is coupled between command select logic 240 and load logic 280. RO buffer 294 records the order in which read commands are issued to memory 120, i.e. RO, as well as the location in RDRB 270 reserved for the corresponding response data. Load logic 280 uses this information to load read response data into the appropriate buckets 272 in RDRB 270. As noted above, buckets 272 are allocated in OCO by gating logic 250. In the embodiment of command reorder logic 210' of FIG. 2C, information on the allocation of buckets 272 may be provided to RO buffer 294 by command select logic 240 or command arbiter 248.

Unload logic 284 transfers read response data from RDRB 270 to graphics system 130 in OCO. For this purpose, OCO buffer 290 provides unload logic with the size of the data response expected for the next read command in OCO. Unload logic 284 uses this information to determine which of buckets 272 holds the response data corresponding to the next read in OCO and when the data loaded in these buckets is valid for transfer to graphics system 130.

One embodiment of unload logic 284 retrieves response data in OCO in the following manner. Unload logic 284 maintains a read pointer (RPTR), which points to the bucket that follows the last data response read from RDRB 270. At initialization, RPTR points to the first bucket in RDRB 270. Unload logic 284 uses the data size specified in OCO buffer 290 for the next read command to determine a pointer (VPTR) to the last bucket that should be occupied by the data provided in response to this read command. For example, if each bucket holds a Qword of response data and the requested data length at the head of OCO buffer 290 is L Qwords long:

$$VPTR=RPTR+L-1.$$

In this embodiment, unload logic 284 monitors the valid bit at the bucket indicated by VPTR. This valid bit is set when the last Qword provided in response to the read command has been loaded in RDRB 270 so all of the data for the read is ready for transfer to graphics system 130. Unload logic 284 unloads the L Qwords, transfers them to graphics system 130, resets the valid bits on the L slots, and resets RPTR to VPTR+1.

An alternative embodiment of reorder logic 210 uses tags to track command order. In this embodiment, tagging logic associated with, for example, gating logic 250 or command queue 220 tags a command to reflect the order in which it is received (OCO). Tagged commands are forwarded to the resource through reorder slots 230 and command selection logic 240, as before. In the case of a read command, for example, load logic 280 uses the command tag to load the command response into an appropriate bucket(s) in RDRB 270. One advantage of this approach is that it allows the resource, e.g. memory 120, to do its own command reordering in addition to that done by reorder logic 210. Since the OCO data travels to the resource with the command, any reordering of commands by the resource does not affect the appended OCO information.

Although the preceding description focuses on reordering read commands, write commands may also be reordered to improve the efficiency with which memory 120 operates. In the disclosed embodiment of the invention, a write command and the data it writes are coupled to reorder logic 150 separately. Accordingly, reorder logic 210 will include a write data buffer (WDB, FIG. 2D) to store the data as it is received, i.e. in OCO.

Figure 2D:
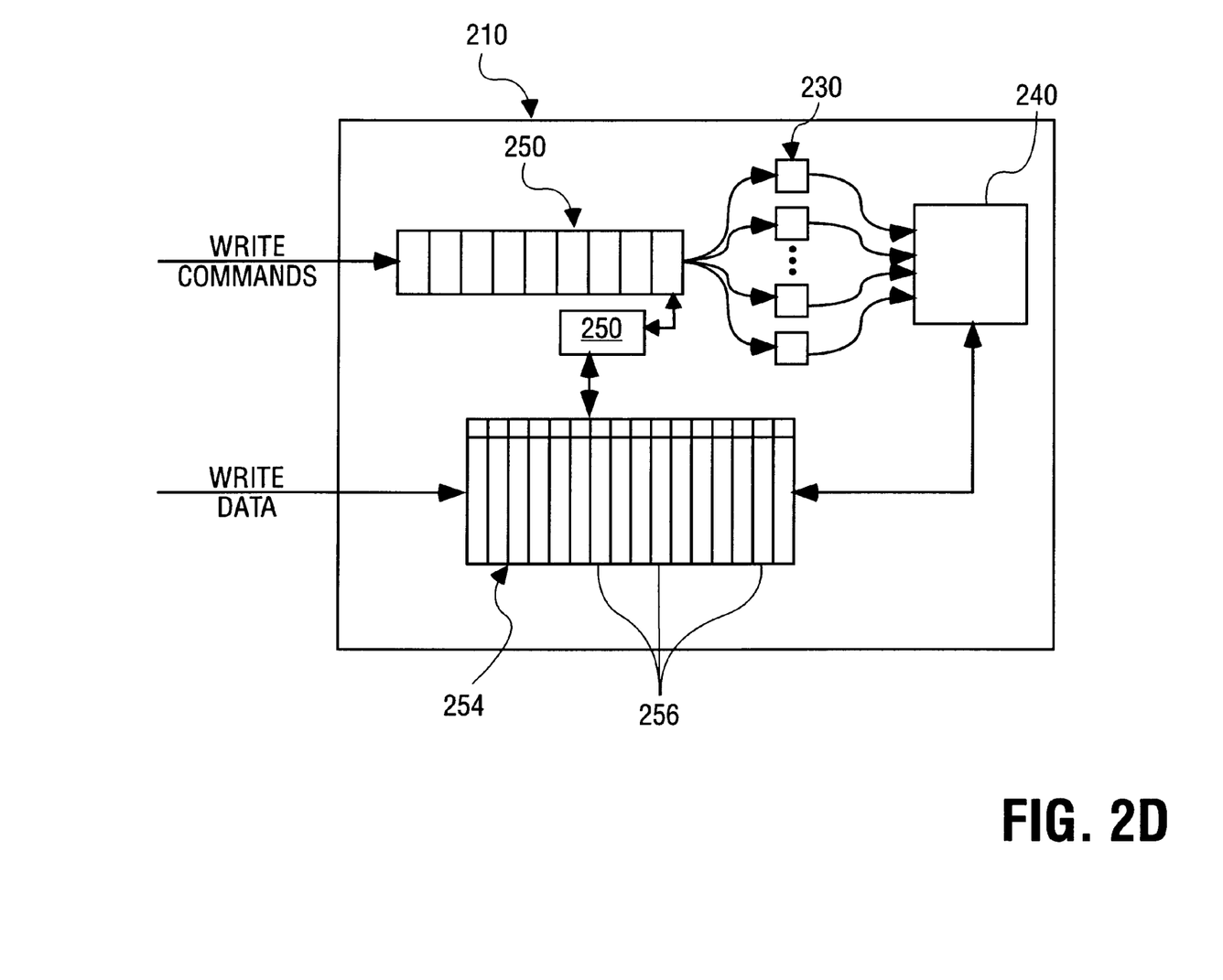
FIG. 2D is a block diagram of an embodiment of the command reorder logic of FIG. 1, suitable for reordering write commands.

Referring now to FIG. 2D, there is shown an embodiment of command reorder logic 210 suitable for reordering write commands. In the disclosed embodiment, gating logic 250 is coupled to a WDB 254 to monitor the arrival of write data. In this configuration, gating logic 250 can stall a write command in command queue 220 until its corresponding write data has been received in WDB 254. Once the data is received, the write command can be processed, and gating logic 250 will forward the write command to reorder slots 230.

In the disclosed embodiment, write data is stored in WDB 254 in OCO. Since write commands are issued to memory 120 in RO, command reorder logic 210 must identify which buckets 256 in WDB 254 correspond to a write commands being issued to memory 120. This translation may be handled, for example, by tagging write commands to indicate their OCO, and reading the tag as a write command issues to determine which buckets 256 hold the associated data. Other methods, including variations of those described above for translation between OCO and RO for read commands, may be used to associate data in WDB 254 with reorder write commands issued by command selection logic 240.

Certain hazards may arise when commands are reordered. One such hazard arises when write commands targeting the same location in memory 120 are reordered, since a subsequent read to the location may retrieve stale data. For this reason, a preferred embodiment of the present invention does not allow writes to the same location in memory 120 to be reordered. Reordering of read and write commands may also create hazards. For similar reasons to that given above, a preferred embodiment of the present invention does not allow a read command to be reordered ahead of a write command to the same location in memory 120. On the other hand, the present invention may reorder a write command ahead of a read command to the same location in memory 120, since this provides the read command with the most recently available data. Other hazards may be identified and treated according to the risks they pose to accurate processing of data.

Figure 3:
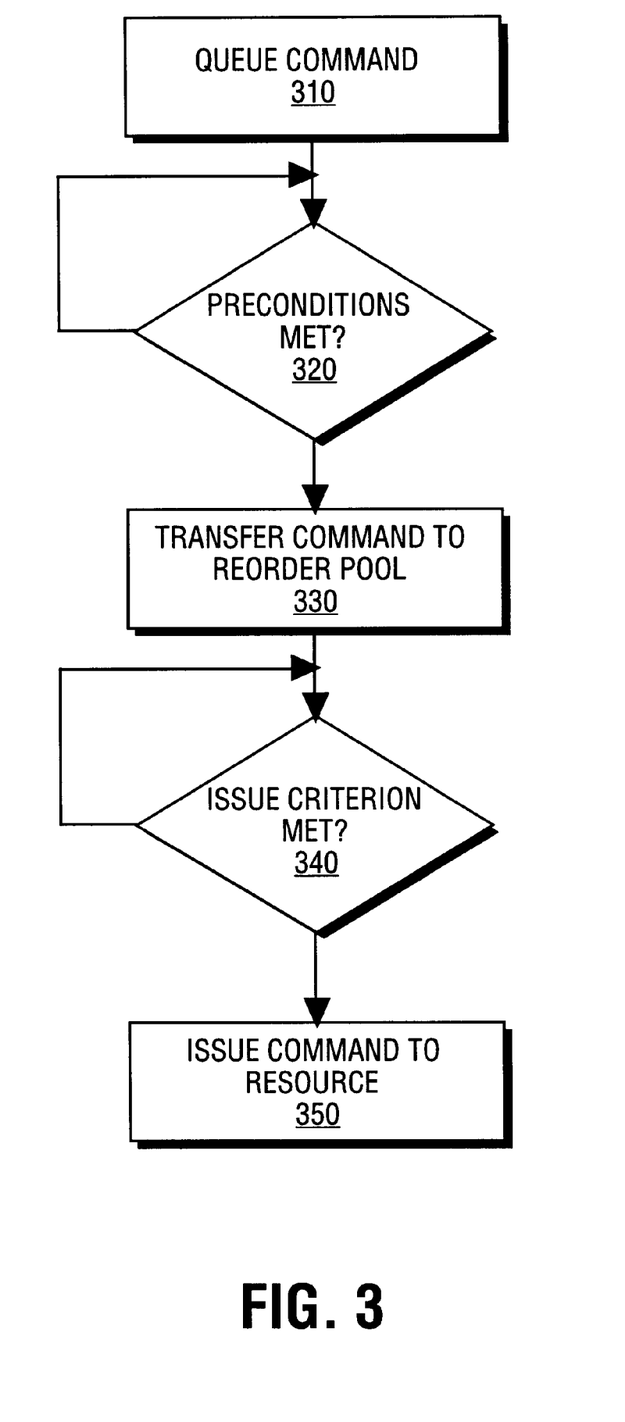
FIG. 3 is represents a method for reordering commands to a resource in accordance with the present invention.

Referring now to FIG. 3, there is shown a flowchart providing an overview of a general method 300 for reordering commands to a resource in accordance with the present invention. A command received from an initiator, e.g. graphics system 130, is queued 310, and any preconditions to forward progress of the command are checked 320. In the case of read commands, the availability of space in a read response buffer, e.g. RDRB 270, is checked. In the case of a write command where read/write reordering is implemented to minimize processor stalls, the precondition may be that all pending reads have been issued to the resource. For other command types, the only precondition may be that the command reach the head of the command queue.

When any required preconditions are met 320, the command is added 330 to a pool of other commands that are candidates for issue to the resource. An efficiency criterion is applied 340 to the candidate commands in this pool, e.g. the command that targets an address on the current open page of memory. A command meeting the criterion 340 is forwarded 350 to the resource for processing when it meets the issue criterion.

Figure 4A:
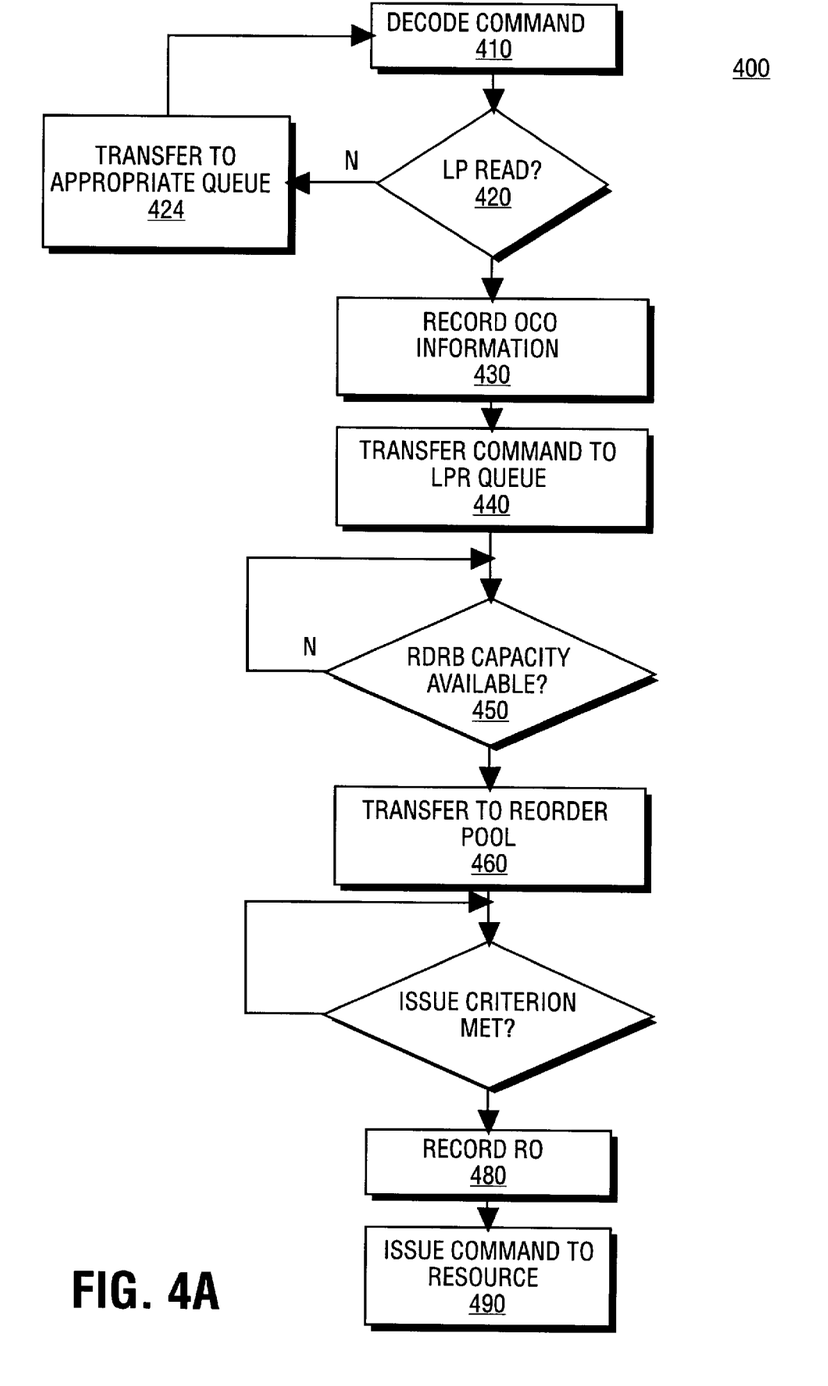
FIG. 4A is a detailed flowchart representing one embodiment of the method of FIG. 3 for reordering read commands.

Referring now to FIG. 4A, there is shown a more detailed flowchart of a method 400 for reordering read commands to a memory device in a manner that reduces page breaks. The disclosed embodiment identifies low priority reads (LPRs) from among high and low priority read and write commands and reorders the LPRs to reduce page breaks.

Initially, a command is decoded 410 and the command type is determined 420. If the command is determined 420 to be a low priority read (LPR), i.e. a candidate for reordering, the length of data requested is recorded 430, and the command is added 440 to an LPR command queue. Other commands, e.g. low priority writes, high priority reads and writes, are transferred 424 to their respective command queues. When the LPR command reaches the head of the LPR queue, e.g. after LPR commands ahead of it in the queue have been processed, it is determined 450 whether the read response buffer has sufficient capacity to accommodate the data that will be returned in response to the LPR command. If capacity is unavailable, the command is stalled until capacity becomes available. If capacity is available, the command is added 460 to a pool of LPRs qualified for issue to memory, e.g. the reorder pool.

Once in the reorder pool, the command is analyzed 470 along with the other qualified LPRs against an efficiency criterion. In one embodiment of the invention, the efficiency criterion identifies an LPR command in the reorder pool that targets an address on the current open page in memory. If no LPR command in the pool meets this criterion or multiple commands do, a secondary criterion, e.g. the oldest LPR command in the pool, is applied. The command identified by the various criteria is recorded 480 and issued 490 to memory for processing.

Figure 4B:
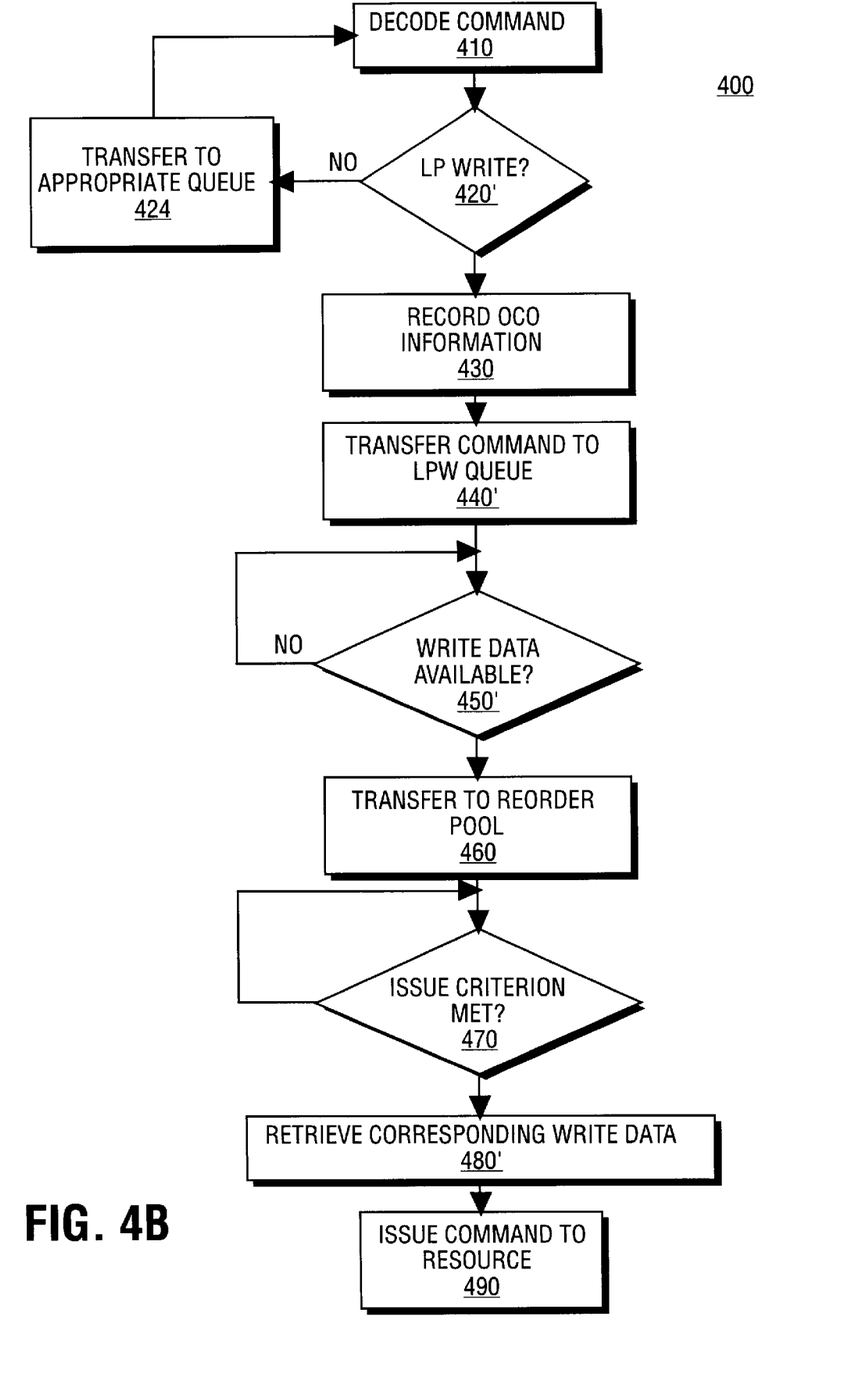
FIG. 4B is a detailed flowchart representing an embodiment of the method of FIG. 4 for reordering write commands.

Referring now to FIG. 4B, there is shown a more detailed flowchart of a method 400' for reordering write commands to a storage resource in a manner that reduces the access latency. Steps of method 400' that are similar to steps of method 400 are labeled with the same reference numbers. The major differences are step 420' identifies a LP write, step 440' transfers the write command to an LPW queue, step 450' checks that the corresponding write data has arrived, and step 480' retrieves the write data when the write command is selected for issue.

Figure 5A:
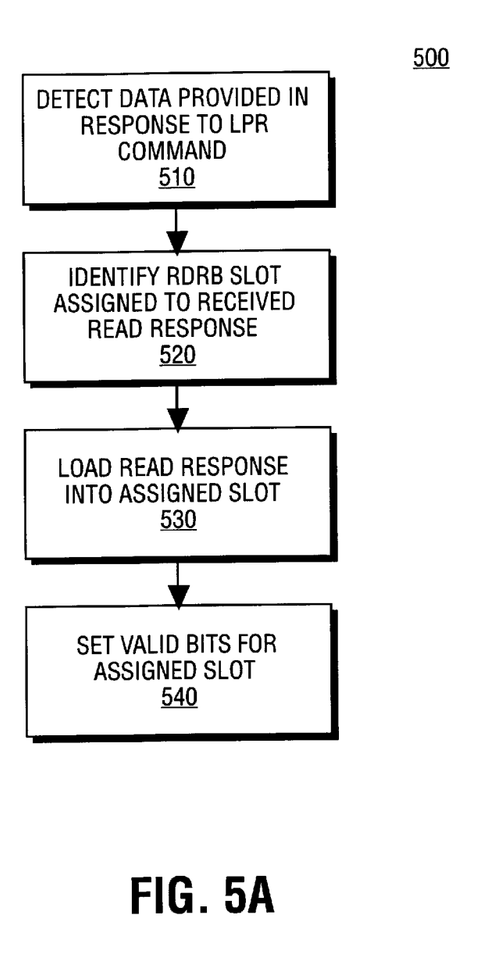
FIGS. 5A and 5B are flow charts of methods for returning data provided in response to reordered read commands in original command order.
Figure 5B:
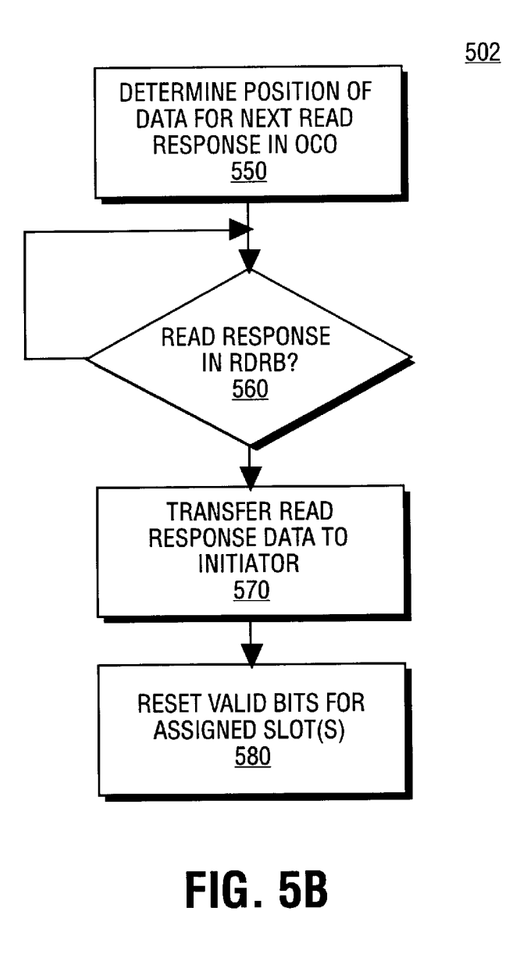

Referring now to FIGS. 5A and 5B, there are shown flowcharts 500, 502 representing a method for returning read response data to the initiating device in original command order. Methods 500 and 502 correspond substantially to the functions implemented by load logic 280 and unload logic 284, respectively, of FIG. 2A.

Referring first to FIG. 5A, data from the resource, e.g. memory 120, that is provided in response to an LPR, is detected 510, and the bucket(s) allocated for the data is identified 520. The data is loaded 530 into the identified bucket(s) and the valid bit(s) associated with the bucket(s) is set 540 to indicate that the data is available for unloading.

Referring now to FIG. 5B, the location of the data provided in response to the next LPR command in OCO is identified 550 and the RDRB is checked 560 to determine if the data is available yet. When the data is available, e.g. when the valid bits of assigned buckets in the RDRB are set, it is transferred 570 to the requesting device and the valid bits are reset 580.

There has thus been provided a system and method for reordering commands to a resource according to a criterion that facilitates more efficient use of the resource. There has also been provided a system and method for returning to the requesting device in the original command order data provided in response to reordered commands. Command reordering may be implemented advantageously with resources such as storage devices. In these cases, reordering groups together commands that access data in a relatively localized address range, to eliminate the overhead associated with more random access methods.

What is claimed is:

1. An apparatus for providing commands to a paged memory device, the apparatus comprising:
   a first command queue to receive commands of a first type;
   a command reorder module to receive commands of a second type and reorder the received second type commands according to an efficiency indication; and
   a command arbiter to track an indication of a memory page targeted by a most recently issued command, and to issue the first and second type commands to the paged memory device, according to a priority scheme.

2. The apparatus of claim 1, wherein the page indication is provided to the command reorder module as the efficiency indication.

3. The apparatus of claim 1, further comprising a response reorder module, the response reorder module to track an order in which commands are received by the apparatus and to return responses to selected commands according to the tracked order.

4. The apparatus of claim 3, wherein the response reorder module monitors data requested by read commands and blocks issue of read commands when the requested data exceeds a maximum value.

5. The apparatus of claim 4, wherein the maximum value is determined by an available storage capacity in the response reorder module.

6. The apparatus of claim 1, further comprising a command decoder to receive commands from an initiating device and to route the first type commands to the first command queue and second type commands to the reorder module.

7. The apparatus of claim 1, wherein the first type commands are high priority commands and the second type commands are low priority commands.

8. A method for issuing commands to a resource, the method comprising:
   identifying each command received from an initiating device as a high priority command or low priority command;
   transferring the high priority commands to a command arbiter;
   receiving an address indication for the resource;
   transferring the low priority commands to the command arbiter in an order indicated by the received address indication; and
   issuing a command to the resource from the command arbiter according to a priority scheme.

9. The method of claim 8, wherein transferring the high priority command to the command arbiter comprises transferring the high priority command to a first command queue gated by the command arbiter.

10. The method of claim 9, wherein issuing a command to the resource comprises:
    issuing a high priority command to the resource if one is available in the first command queue issuing a low priority command indicated by the address indication if a high priority command is not available; and updating the address indication according to an indication of a resource address targeted by the issued command.

11. An apparatus comprising:

a first queue to receive in a first order read commands that target a memory device;

a second queue including storage locations to temporarily store data provided in response to the read commands;

a gating module to determine a data size requested by a read command and to reserve one or more of the storage locations to store the requested data size;

a reorder module to receive read commands from the first queue and to determine according to an efficiency criterion associated with the resource a second order for issuing the received read commands; and a load module to direct data returned in response to the issued read requests to the one or more storage locations according to the second order and an indication of the reserved locations associated with the read requests.

12. The apparatus of claim 11, wherein the gating logic stalls a read command in the first queue when the second queue lacks sufficient storage locations to receive the requested data size.

13. The apparatus of claim 11, further comprising:

a third queue to receive high priority commands; and a command arbiter to receive commands from the third queue and the reorder module and to issue the received commands according to a priority scheme.

14. A computer system comprising:

a memory device;

an initiating device capable of issuing high and low priority commands to the memory device; and a bridge to couple the memory device and the initiating device, the bridge including:

a command reorder module to receive low priority commands in a first order and determine a second order for the low priority commands according to an address indication associated with the memory device;

a command queue to receive high priority commands; and a command selector to issue commands from the command queue and the command reorder module according to a priority scheme.

15. The computer system of claim 14, wherein the memory device is a paged memory device and the address indication represents an open page for the paged memory device.

16. The computer system of claim 14, wherein the bridge includes a command decoder to identify high and low priority commands from the initiating device and to route the high and low priority commands to the command queue and the command reorder module, respectively.

17. The computer system of claim 14, wherein the bridge further includes a data reorder module to monitor an order of receipt of high and low priority commands and to return data provided in response to the high and low priority commands to the initiating device according to the order of receipt.

18. The computer system of claim 14, wherein the command selector selects a command from the command queue if a command is available in the command queue and selects a command from the reorder module if no command is available from the command queue.

19. The computer system of claim 18, wherein the command selector provides to the reorder module a memory page associated with a last issued command as the address indication.

* * * * *

UNITED STATES PATENT AND TRADEMARK OFFICE
CERTIFICATE OF CORRECTION

PATENT NO. : 6,112,265
DATED : August 29, 2000
INVENTOR(S) : Harriman et al.

It is certified that error appears in the above-identified patent and that said Letters Patent is hereby corrected as shown below:

Column 1,
Line 15, delete "Modem", insert -- Modern --.

Column 5,
Line 16, delete "intercolnect", insert -- interconnect --.

Signed and Sealed this

First Day of July, 2003

JAMES E. ROGAN
*Director of the United States Patent and Trademark Office*